Figure 1:
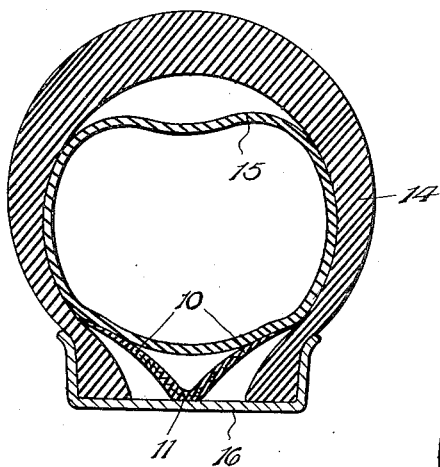

Feb. 13, 1923.

A. L. LEETH ET AL 1,445,443

TIRE FLAP

Filed Apr. 12, 1922

Inventors
A. L. Leeth.
E. H. Leeth.

By Thomas H. Johnston
Attorney

Patented Feb. 13, 1923.

1,445,443

UNITED STATES PATENT OFFICE.

ASHBY L. LEETH AND ELDON H. LEETH, OF WASHINGTON, DISTRICT OF COLUMBIA.

TIRE FLAP.

Application filed April 12, 1922. Serial No. 552,004.

*To all whom it may concern:*

Be it known that we, ASHBY L. LEETH and ELDON H. LEETH, citizens of the United States, residing at Washington, District of Columbia, have invented certain new and useful Improvements in Tire Flaps, of which the following is a specification.

This invention relates to an improved tire flap and seeks, as one of its principal objects, to provide a flap which will be strong and durable, which will not buckle, which will resist rust and water, and which will be so formed as to be uniform in circumference for any given size of the flap.

A further object of the invention is to provide a flap so shaped that the flap will be self centering within a tire casing so that the casing with the flap therein may be freely applied to a rim without fear of dislocating the flap.

Another object of the invention is to provide a flap so constructed that an inner tube, when being inflated, cannot work beneath the margins of the flap to cause ultimate pinching of the tube.

And the invention has as a still further object, to provide a flap which, while being flexible, will, nevertheless, possess a permanent natural shape of a contour to resist flattening pressure of an inner tube in such manner that, as the tube is inflated, air within the tire casing between the tube and flap will be permitted to escape whereby to prevent the formation of air blisters between the tube and flap or buckling of the tube.

Other and incidental objects will appear hereinafter.

Figure 2:
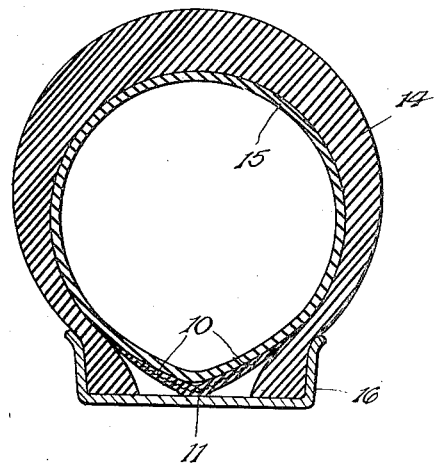
Figure 3:
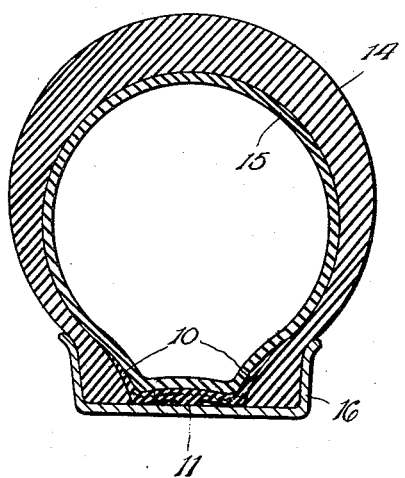
Figure 4:
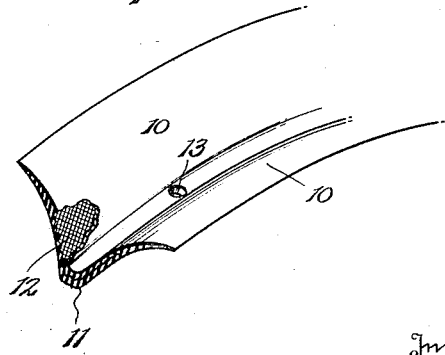

In the drawing:

Figure 1 is a cross sectional view showing our improved flap in connection with a conventional tire, inner tube and rim, the inner tube being practically collapsed, Figure 2 is a similar view showing the position assumed by the flap when the tire is partly inflated, Figure 3 is a view similar to Figure 2, showing the position assumed by the flap when the tire is fully inflated, and Figure 4 is a fragmentary sectional view through the flap.

In carrying the invention into effect, we employ a flexible elastic band of relatively soft rubber. As most clearly illustrated in Figure 4, the band is substantially V-shape in cross section and is provided with oppositely bowed sides 10. The band is molded and is accordingly a preformed integral one piece structure. In this way, the band is, while being flexible, nevertheless, permanently shaped to define an intermediate annular stiffening rib 11 at the crotch between the sides 10, the rib lying at the inner face of the band, and in this connection it is to be noted that the band is thickest at the stiffening rib while the sides thereof taper gradually in thickness from the rib to their free edges where they are feathered. A dual object is thus accomplished in molding the band since, due to its shaping, the band is not only stiffened medially but also, the band will be of uniform mean circumference for any given size. Embedded in the band medially thereof is a reinforcing core or strip 12 of fabric which extends across the crotch of the band well up the sides thereof. This strip of fabric is cut on the bias so that the band may stretch circumferentially and is entirely covered by the rubber of the band so as to be protected from moisture. Thus, the band is well adapted to not only resist rust but also the deteriorating effects of water as well. Formed through the crotch of the band at any suitable point circumferentially of the band is an opening 13 to freely accommodate a tire valve.

In Figures 1, 2 and 3 of the drawing, we have shown the flap in connection with a conventional tire casing 14, inner tube 15, and rim 16. Initially, the inner tube is placed within the casing when the flap is then arranged in position between the free margins of the sides of the casing encircled by the tube, the tube resting between the sides of the flap. The casing with the tube and flap therein may then be fitted upon the rim, the flap, of course, being adapted to stretch over the rim as the casing is applied. In this connection, it is to be noted, as shown in Figure 1, that when the flap is placed within the casing, as just indicated, the oppositely bowed sides 10 of the flap will engage the sides of the casing and, due to the natural permanent shape of the flap and its consequent inherent tendency to resist distortion, the sides thereof will thus coact with the sides of the casing for centering the flap within the casing so that the casing may be readily applied to the rim without fear of dislocating the flap. The flap is accordingly self centering and will not become tilted within the casing to cause buckling of the inner tube. Furthermore, it is to be noted, as also brought out in Figure 1, that when the casing is applied to the rim, the free edges of the sides of the flap will lie close against the sides of the casing and since the sides of the flap are bowed and are thus adapted to sustain outward tension thereon by the tube, the tube is prevented from flexing the sides of the flap outwardly and springing the free edges thereof away from the sides of the casing. Accordingly, the sides of the flap will, due to their bowing, maintain their free edges in close contact with the casing so that the inner tube will be prevented from working beneath the edges of the flap to become pinched thereby. This tendency of the tube to enter between the edges of the flap and the casing is, of course, most pronounced when the casing is being applied to the rim and the inner tube is substantially collapsed.

As the inner tube is inflated, as brought out in Figure 2, the sides of the flap are bowed outwardly against the sides of the casing. However, due to the shaping of the flap and the presence of the stiffening rib 11 thereon the outward pressure of the tube tending to flatten the rib against the rim will be resisted by the intermediate portion of the flap. Accordingly, throughout a portion of the operation of inflating the tube the rib will cause a channel to remain between the crotch of the flap and the tube and, as will be appreciated, air between the tube and flap may escape through this channel and through the opening 13 in the flap. Trapping of air between the tube and flap to cause air blisters between the tube and flap or buckling of the tube will thus be prevented. When the tube is fully inflated, as shown in Figure 3, the sides of the flap are flattened against the sides of the casing while the crotch of the flap is flattened against the rim so that the flap will be tightly held between the tube and rim for protecting the tube. We accordingly provide a flap of particularly efficient construction and, as will now be appreciated, a flap well adapted for use in connection with conventional automobile rims and tire casings.

Having thus described the invention, what is claimed as new is:

1. A tire flap including a pre-formed flexible elastic band having angularly disposed dished sides to resist flexing.

2. A tire flap including a flexible elastic band pre-formed to resist distortion and having diverging oppositely bowed sides joined by an integral thickened intermediate connecting portion.

3. A tire flap including a flexible elastic band pre-formed to resist distortion and provided with diverging sides having concave outer faces.

4. A tire flap including a flexible elastic band pre-formed to resist distortion and having a medial stiffening rib, the band being gradually tapered in thickness from said rib to its edges and provided with diverging oppositely bowed sides having concave outer faces.

5. A tire flap including a preformed flexible elastic substantially V-shaped band having oppositely bowed sides meeting to define a relatively narrow crotch at the outer face of the band and a medial stiffening rib at the inner face of the band.

In testimony whereof we affix our signatures.

ASHBY L. LEETH. [L. S.]
ELDON H. LEETH. [L. S.]